United States Patent
Huang

(10) Patent No.: US 7,505,730 B2
(45) Date of Patent: Mar. 17, 2009

(54) CELLULAR PHONE JAMMER THAT PERMITS CELLULAR COMMUNICATION IN AN EMERGENCY

(76) Inventor: Dennis Huang, 1 Fl., No. 1, Lane 9, Ningpo E. St., Taipei (TW)

( * ) Notice: Subject to any disclaimer, the term of this patent is extended or adjusted under 35 U.S.C. 154(b) by 634 days.

(21) Appl. No.: 11/303,979

(22) Filed: Dec. 19, 2005

(65) Prior Publication Data

US 2007/0099559 A1     May 3, 2007

(30) Foreign Application Priority Data

Nov. 1, 2005     (TW)     ................. 94218863 U

(51) Int. Cl.
*H04K 3/00*     (2006.01)
(52) U.S. Cl. ........................ 455/1; 455/404.1
(58) Field of Classification Search ............ 455/1, 455/404.1, 571, 572, 127.1, 298, 343.1, 127, 455/343
See application file for complete search history.

(56) References Cited

U.S. PATENT DOCUMENTS 6,301,475 B1     10/2001     Saarela et al. ............... 455/426

*Primary Examiner*—Tu X Nguyen
(74) *Attorney, Agent, or Firm*—Bacon & Thomas, PLLC

(57) ABSTRACT

The present invention is related to a cellular phone jammer permitting cellular phones to be used in an emergency, and includes a cellular phone signal-obstructing apparatus and an alarm apparatus. The cellular phone signal-obstructing apparatus further has a cellular phone signal-blocking unit, a power supply unit, and a trigger unit. The cellular phone signal-blocking unit sends out a blocking-signal to disconnect the communication between cellular phones and cellular tower within the effective range. The trigger unit connects to the power supply unit and cellular phone signal-blocking unit in series. The invention effectively disconnect the communication between the cellular phones and cellular tower within a range, yet automatically turns off the jammer when there is an emergency in the designated area to resume normal communication between cellular phones and cellular tower so that the users can call for help.

8 Claims, 3 Drawing Sheets

CELLULAR PHONE JAMMER THAT PERMITS CELLULAR COMMUNICATION IN AN EMERGENCY

BACKGROUND OF THE INVENTION

1. Field of the Invention

The invention is related to a cellular phone jammer; more particularly, a cellular phone jammer that permits cellular communication in an emergency.

2. Description of Related Art

Due to the wide spread use of cellular phones, they have become very important electronic products to the human life. However, cellular phones are not allowed in many occasions, such as in the hospitals, gas stations, opera halls, and many other performance fields.

Therefore, a cellular phone jammer, claiming to effectively obstruct cellular phone signals within a specific range so as to disable the cellular phone's communication function, is available on the market. U.S. Pat. No. 6,301,475 granted to Saarela, et al. for a "Procedure for limiting the mobility area of a terminal device in a wireless local loop" defines a mobility area (MOA) to perform inhibiting communications in accordance with geographical locations. However, in critical conditions such as a fire accident in a theater, it would cause a tragedy if the cellular phone cannot be used for emergency calls. This is the main reason why the cellular phone jammer is not legal yet in many countries. Therefore, it is desirable to provide a cellular phone jammer to be used ordinarily to effectively inhibit the communication function of the cellular phones, yet to be automatically turned off to allow the communication when there is an emergency within the area.

SUMMARY OF THE INVENTION

The present invention provides a cellular phone jammer that still permits cellular phones to be used when an emergency occurs within the designated area. The cellular phone jammer effectively disables the communication of the cellular phones in a range, but is automatically turned off when there is an emergency to resume the normal function of cellular phones so that people can call for help through cellular phones.

The present invention is related to a cellular phone jammer that permits cellular communication in an emergency, which comprises a cellular phone signal-obstructing apparatus and an alarm apparatus.

The cellular phone signal-obstructing apparatus comprises a cellular phone signal-blocking unit, a power supply unit, and a trigger unit. The cellular phone signal-blocking unit sends out a blocking-signal that occupies the frequency channel to disconnect the communication between cellular phones and the cellular tower (base station) within the designated range. The power supply unit provides required power to the cellular phone signal-obstructing apparatus. The trigger unit connects to the power supply unit and cellular phone signal-blocking unit in series.

An alarm apparatus is coupled with the cellular phone signal-obstructing apparatus. When the alarm apparatus actuates the trigger unit of the cellular phone signal-obstructing apparatus, the trigger unit immediately disconnects the power supply unit and the cellular phone signal-blocking unit, and thus cellular phones within the effective range resume their normal communication with the cellular tower.

The alarm apparatus includes a fire detector, a smoke detector, an anti-theft alarm system, a safety system, or other alarm devices.

The alarm apparatus and trigger unit of the cellular phone signal-obstructing apparatus are connected directly by a transmission line but may also be accomplished via infrared ray transmission, wireless Bluetooth™ transmission, radio frequency signal transmission, or other equivalent means.

DETAILED DESCRIPTION OF THE PREFERRED EMBODIMENT

Figure 1:
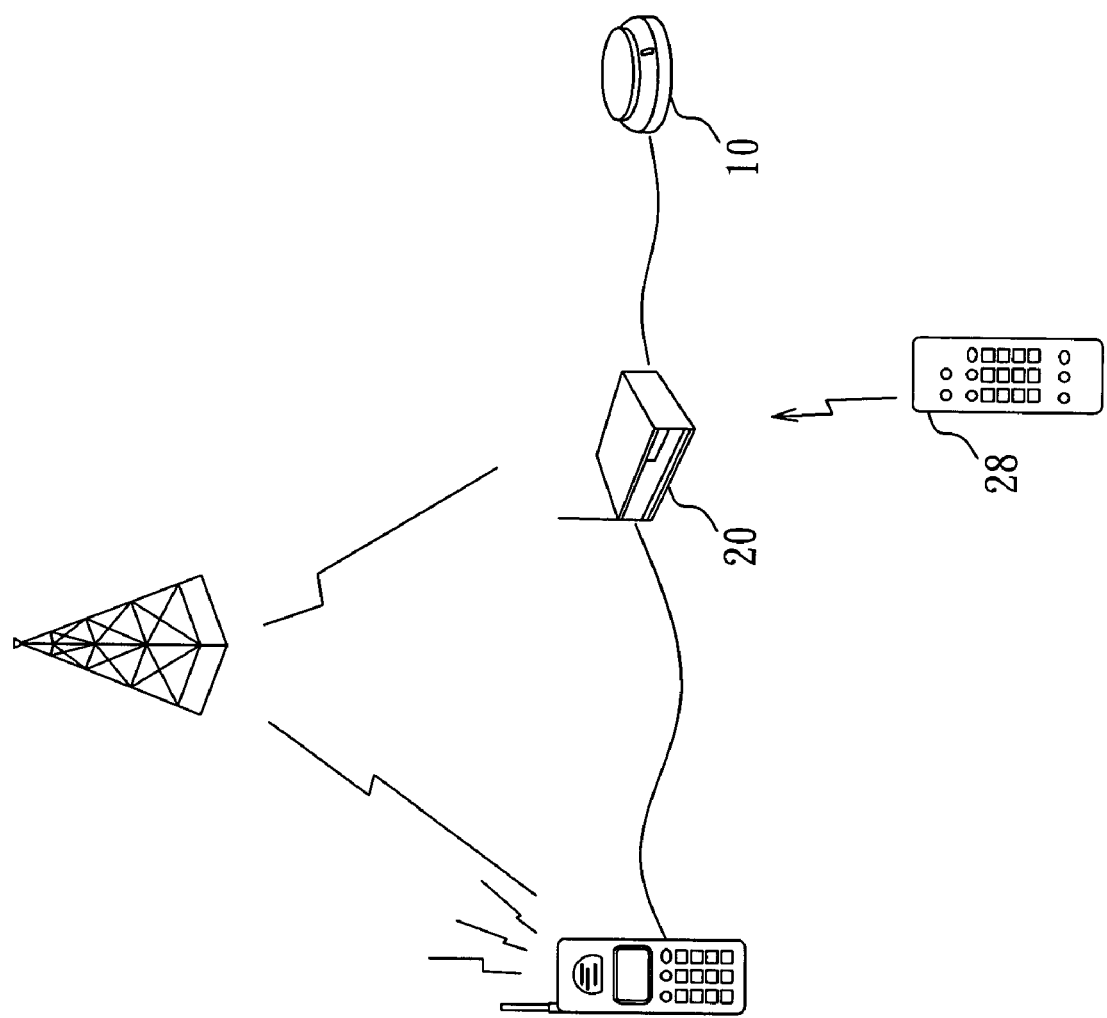
FIG. 1 is a schematic diagram of one preferred embodiment of the present invention.
Figure 2:
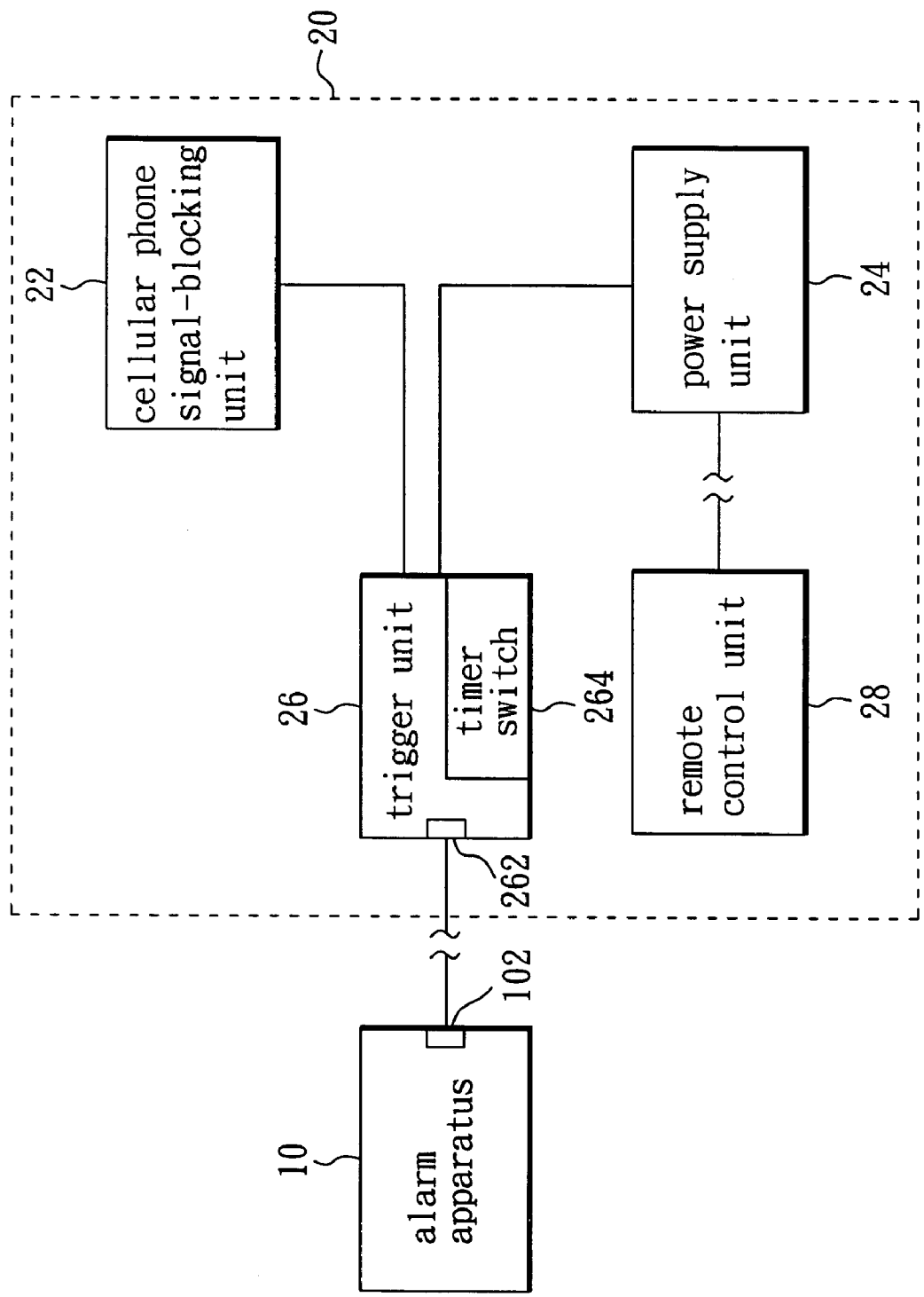
FIG. 2 is a functional block diagram of one preferred embodiment of the present invention.

Please refer to FIG. 1, wherein a schematic diagram of one preferred embodiment of the present invention is shown, and to FIG. 2 for a functional block diagram. The present invention comprises a cellular phone signal-obstructing apparatus 20 and an alarm apparatus 10.

In the preferred embodiment, the operating frequency band of the cellular phones may be 800 MHz, 900 MHz, 1800 MHz, 1900 MHz, or 2100 MHz. The cellular phone signal-obstructing apparatus 20 comprises a cellular phone signal-blocking unit 22, a power supply unit 24, a trigger unit 26, and a remote control unit 28.

In the preferred embodiment, the cellular phone signal-blocking unit 22 sends out a blocking-signal that occupies the frequency channel to disconnect the communication between cellular phones and cellular tower within the effective range. The power supply unit 24 provides required power to the cellular phone signal-obstructing apparatus 20. The trigger unit 26 connects to the power supply unit 24 and cellular phone signal-blocking unit 22 in series. The trigger unit 26 comprises a timer switch 264 and a transmission port 262. The timer switch 264 sets the disconnecting time of the trigger unit 26. This is to set the normal communication time of the cellular phones. Once the timer switch 264 finishes its countdown, it automatically starts to send out blocking-signals. The cellular phones thus assume an unavailable status. Transmission port 262 provides connections to the alarm apparatus 10 and the trigger unit 26. The remote control unit 28 is utilized for remote control.

In FIG. 2, the alarm apparatus 10 is coupled with the trigger unit 26 of the cellular phone signal-obstructing apparatus 20. The alarm apparatus 10 is a fire detector. Alternatively, it may be a smoke detector, an anti-theft alarm system, a safety system, or other alarm devices. The alarm apparatus 10 comprises a transmission port 102, wherein the transmission port 102 corresponds to transmission port 262 of the trigger unit 26. In this preferred embodiment, the alarm apparatus 10 and trigger unit 26 of the cellular phone signal-obstructing apparatus 20 are connected directly by a transmission line. The connection may be also accomplished via infrared ray transmission, Bluetooth™ transmission, radio frequency signal transmission, or the like.

Figure 3:
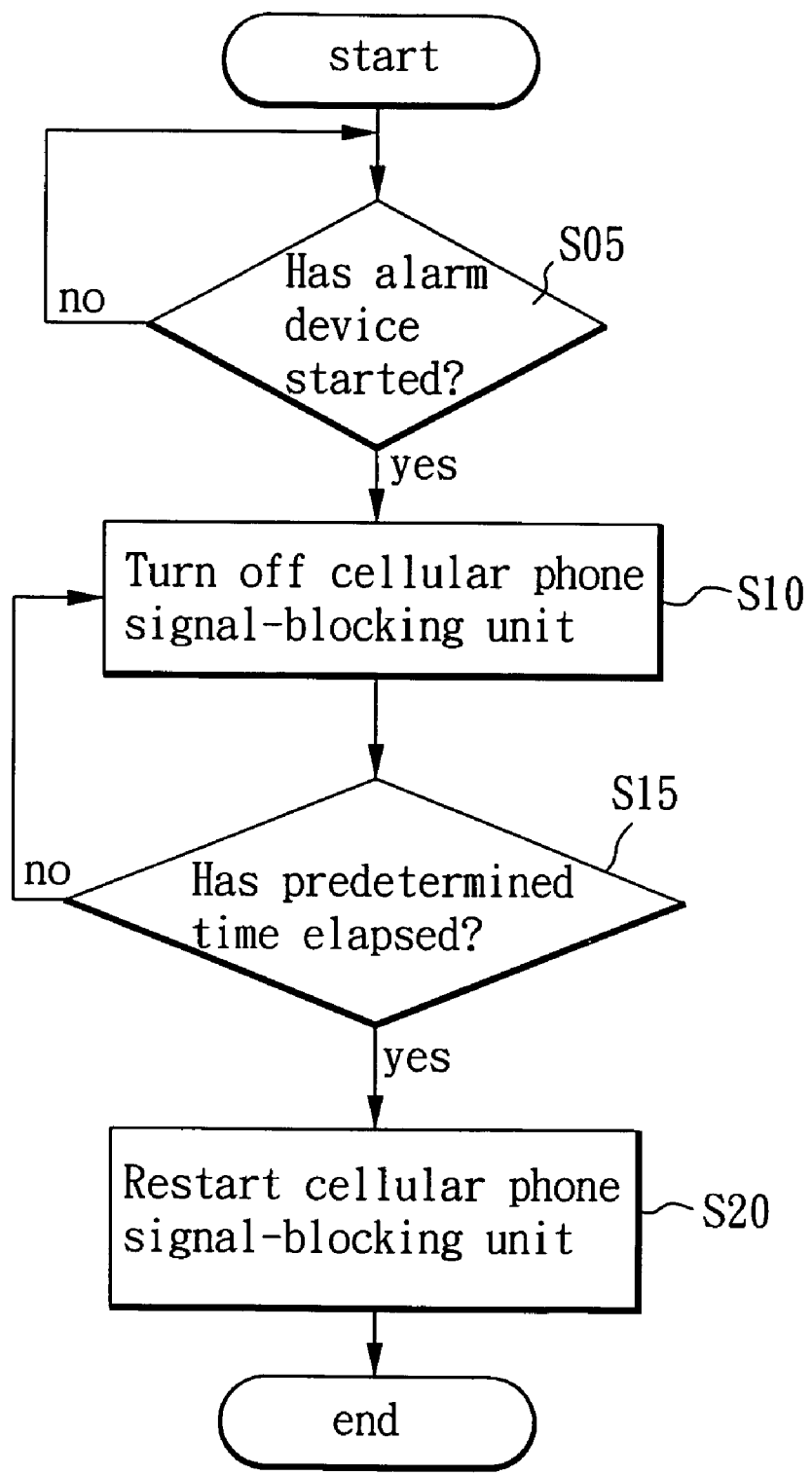
FIG. 3 is a flow chart of one preferred embodiment of the present invention.

Please further refer to FIG. 3 for the flow chart of one preferred embodiment of the present invention. When the cellular phone signal-blocking unit 22 is operating, cellular phones in the effective range are unable to function normally. However, in an emergency situation, such as when there is a fire alarm, the alarm apparatus 10 actuates the trigger unit 26 of the cellular phone signal-obstructing apparatus 20 (S05). The trigger unit 26 immediately disconnects the power supply unit 24 and the cellular phone signal-blocking unit 22. In other words, the operation of the cellular phone signal-blocking unit 22 is stopped (S10). Then cellular phones in the effective range will communicate with cellular tower normally. Finally, after counting down of the timer switch 264 of the trigger unit 26 is completed (S15), the cellular phone signal-blocking unit 22 is resumed to effectively disconnect the communication between the cellular phones and the cellular tower within the effective range (S20). By doing so, the present invention resumes the communication between cellular phone and cellular tower within the effective range in an emergency situation, thus enabling people to call for help.

The above mentioned timer switch 264 may be manually set by users for a predetermined time such as 5 minutes or 10 minutes, or turned off. The predetermined time determines the duration that the cellular phones can communicate with cellular tower normally in an emergency situation.

Although the present invention has been explained in relation to its preferred embodiment, it is to be understood that many other possible modifications and variations can be made without departing from the scope of the invention as hereinafter claimed.

What is claimed is:

1. A cellular phone jammer permitting cellular phones to be used in an emergency within a designated area, comprising:
    a cellular phone signal-obstructing apparatus, including:
    a cellular phone signal-blocking unit which sends out a blocking-signal that occupies a frequency channel to disconnect the communication between cellular phones and cellular tower within an effective range;
    a power supply unit which provides required power to the cellular phone signal-obstructing apparatus; and
    a trigger unit which connects to the power supply unit and cellular phone signal-blocking unit in series; and
    an alarm apparatus which is coupled with the cellular phone signal-obstructing apparatus; wherein the trigger unit immediately disconnects the power supply unit and the cellular phone signal-blocking unit when the alarm apparatus actuates the trigger unit of the cellular phone signal-obstructing apparatus, thereby resuming normal functions of the cellular phones.

2. The cellular phone jammer as claimed in claim 1, wherein the trigger unit of the cellular phone signal-obstructing apparatus further comprises a timer switch which sets the disconnecting duration of the trigger unit.

3. The cellular phone jammer as claimed in claim 1, wherein the cellular phone signal-obstructing apparatus further comprises a remote control unit.

4. The cellular phone jammer as claimed in claim 1, wherein the alarm apparatus comprises a fire detector.

5. The cellular phone jammer as claimed in claim 1, wherein the alarm apparatus and the trigger unit further comprise a transmission port respectively.

6. The cellular phone jammer as claimed in claim 1, wherein the alarm apparatus connects to the trigger unit of the cellular phone signal-obstructing apparatus.

7. The cellular phone jammer as claimed in claim 6, wherein the alarm apparatus is directly connected to the trigger unit of the cellular phone signal-obstructing apparatus via a transmission line.

8. The cellular phone jammer as claimed in claim 1, wherein the operating frequency band of the said cellular phones is selected from at least one of the following: 800 MHz, 900 MHz, 1800 MHz, 1900 MHz, and 2100 MHz.

* * * * *